United States Patent
Coffey et al.

(10) Patent No.: US 7,930,152 B2
(45) Date of Patent: Apr. 19, 2011

(54) METHOD FOR SIGNAL AND IMAGE PROCESSING WITH LATTICE GAS PROCESSES

(75) Inventors: Mark W. Coffey, Boulder, CO (US); Gabriel G. Colburn, Colorado Springs, CO (US)

(73) Assignee: Colorado School of Mines, Golden, CO (US)

(*) Notice: Subject to any disclaimer, the term of this patent is extended or adjusted under 35 U.S.C. 154(b) by 836 days.

(21) Appl. No.: 11/777,205

(22) Filed: Jul. 12, 2007

(65) Prior Publication Data

US 2008/0052047 A1 Feb. 28, 2008

Related U.S. Application Data

(60) Provisional application No. 60/807,410, filed on Jul. 14, 2006.

(51) Int. Cl.
G06F 7/60 (2006.01)
G06F 17/10 (2006.01)

(52) U.S. Cl. ............... 703/2; 706/14; 703/13; 703/21

(58) Field of Classification Search .............. 703/13, 703/2
See application file for complete search history.

(56) References Cited

U.S. PATENT DOCUMENTS

| | | | |
|---|---|---|---|
| 5,917,322 A * | 6/1999 | Gershenfeld et al. ......... 324/307 |
| 6,459,097 B1 | 10/2002 | Zagoskin | |
| 6,504,172 B2 | 1/2003 | Zagoskin et al. | |
| 6,537,847 B2 | 3/2003 | Zagoskin et al. | |
| 6,563,310 B2 | 5/2003 | Zagoskin | |
| 6,563,311 B2 | 5/2003 | Zagoskin | |
| 6,573,202 B2 | 6/2003 | Ivanov et al. | |
| 6,576,951 B2 | 6/2003 | Ivanov et al. | |
| 6,580,102 B2 | 6/2003 | Ivanov et al. | |
| 6,605,822 B1 | 8/2003 | Blais et al. | |
| 6,614,047 B2 | 9/2003 | Tzalenchuk et al. | |
| 6,627,915 B1 | 9/2003 | Ustinov et al. | |
| 6,627,916 B2 | 9/2003 | Amin et al. | |
| 6,631,202 B2 * | 10/2003 | Hale ......................... 382/128 |
| 6,670,630 B2 | 12/2003 | Blais et al. | |
| 6,728,131 B2 | 4/2004 | Ustinov | |
| 6,753,546 B2 | 6/2004 | Tzalenchuk et al. | |
| 6,784,451 B2 | 8/2004 | Amin et al. | |
| 6,791,109 B2 | 9/2004 | Tzalenchuk et al. | |
| 6,803,599 B2 | 10/2004 | Amin et al. | |
| 6,812,484 B2 | 11/2004 | Tzalenchuk et al. | |
| 6,822,255 B2 | 11/2004 | Tzalenchuk et al. | |
| 6,885,325 B2 | 4/2005 | Omelyanchouk et al. | |
| 6,897,468 B2 | 5/2005 | Blais et al. | |
| 6,900,454 B2 | 5/2005 | Blais et al. | |

(Continued)

OTHER PUBLICATIONS

Pravia et al, "Experimental Demonstration of Quantum Lattice Gas Computation" Quantum Information Processing, vol. 2, Nos. 1-2, Apr. 2003.*

(Continued)

Primary Examiner — Mary C Jacob
(74) Attorney, Agent, or Firm — Dorsey & Whitney LLP

(57) ABSTRACT

A method for simulating a partial differential equation to perform image and signal processing. The method utilizes quantum and classical lattice gas processes to simulate the partial differential equation. The lattice gas processes may be run on a type I quantum computer, type II quantum computer or a classical computer. A system for simulating and solving a partial differential equation comprising a quantum computer and a classical processor.

9 Claims, 9 Drawing Sheets

U.S. PATENT DOCUMENTS

| | | | |
|---|---|---|---|
| 6,900,456 B2 | 5/2005 | Blais et al. | |
| 6,905,887 B2 | 6/2005 | Amin et al. | |
| 6,911,664 B2 | 6/2005 | Il'ichev et al. | |
| 6,919,579 B2 | 7/2005 | Amin et al. | |
| 6,930,320 B2 | 8/2005 | Blais et al. | |
| 6,936,841 B2 | 8/2005 | Amin et al. | |
| 6,943,368 B2 | 9/2005 | Amin et al. | |
| 6,960,780 B2 | 11/2005 | Blais et al. | |
| 6,979,836 B2 | 12/2005 | Zagoskin et al. | |
| 6,987,282 B2 | 1/2006 | Amin et al. | |
| 7,002,174 B2 | 2/2006 | Il'ichev et al. | |
| 7,015,499 B1 | 3/2006 | Zagoskin | |
| 7,018,852 B2 | 3/2006 | Wu et al. | |
| 7,042,005 B2 | 5/2006 | Il'ichev et al. | |
| 7,135,701 B2 | 11/2006 | Amin et al. | |
| 7,216,038 B2 * | 5/2007 | Vitaliano et al. | 702/19 |
| 7,230,266 B2 | 6/2007 | Hilton et al. | |
| 7,253,654 B2 | 8/2007 | Amin | |
| 7,268,576 B2 | 9/2007 | Amin | |
| 7,277,872 B2 * | 10/2007 | Raussendorf et al. | 706/14 |
| 7,307,275 B2 | 12/2007 | Lidar et al. | |
| 7,332,738 B2 | 2/2008 | Blais et al. | |
| 7,335,909 B2 | 2/2008 | Amin et al. | |
| 7,353,148 B1 * | 4/2008 | Meyers et al. | 703/2 |
| 7,418,283 B2 | 8/2008 | Amin | |
| 2002/0177529 A1 | 11/2002 | Ustinov | |
| 2002/0179937 A1 | 12/2002 | Ivanov et al. | |
| 2003/0021518 A1 | 1/2003 | Smirnov et al. | |
| 2003/0027724 A1 | 2/2003 | Rose et al. | |
| 2003/0042481 A1 | 3/2003 | Tzalenchuk et al. | |
| 2003/0063426 A1 | 4/2003 | Smirnov et al. | |
| 2003/0098455 A1 | 5/2003 | Amin et al. | |
| 2003/0111661 A1 | 6/2003 | Tzalenchuk et al. | |
| 2003/0146429 A1 | 8/2003 | Tzalenchuk et al. | |
| 2003/0146430 A1 | 8/2003 | Tzalenchuk et al. | |
| 2003/0169041 A1 | 9/2003 | Coury et al. | |
| 2004/0095803 A1 | 5/2004 | Ustinov | |
| 2004/0140537 A1 | 7/2004 | Il'ichev et al. | |
| 2004/0167036 A1 | 8/2004 | Amin et al. | |
| 2004/0170047 A1 | 9/2004 | Amin et al. | |
| 2004/0173787 A1 | 9/2004 | Blais et al. | |
| 2004/0173792 A1 | 9/2004 | Blais et al. | |
| 2004/0173793 A1 | 9/2004 | Blais et al. | |
| 2004/0238813 A1 | 12/2004 | Lidar et al. | |
| 2005/0101489 A1 | 5/2005 | Blais et al. | |
| 2005/0162302 A1 | 7/2005 | Omelyanchouk et al. | |
| 2006/0147154 A1 | 7/2006 | Thom et al. | |

OTHER PUBLICATIONS

Jawerth et al, "Lattice Boltzmann Models for Anisotropic Diffusion of Images", Journal of Mathematical Imaging and Vision 11, pp. 231-237, 1999.*

Yepez, Jeffrey, ("Type-II Quantum Computers", Quantum Computing Colloquium, Nuclear Engineering Department, MIT, Sep. 27, 1999.*

Chen, Zhiying, "Experimental Demonstration and Exploration of Quantum Lattice Gas Algorithms", Thesis, Massachusetts Institute of Technology, Feb. 2005.*

Vahala et al, "Quantum Lattice Gas Representation of Some Classical Solitons", Physics Letters A 310, 2003.*

Venegas-Andraca et al, "Storing Images in Entangled Quantum Systems", eprint arXiv:quant-ph/0402085, Feb. 12, 2004.*

Alvarez, et al., "Image Selective Smoothing and Edge Detection by Nonlinear Diffusion. II" SIAM Journal on Numerical Analysis, vol. 29, No. 3, Jun. 1992, pp. 845-866.

Berman, et al., "Simulation of the diffusion equation on a type-II quantum computer," Physical Review, A 66, 2002, pp. 012310-1-021310-8.

Berns, et al., "Implementation Schemes for the Factorized Quantum Lattice-Gas Algorithm for the One Dimensional Diffusion Equation Using Persistent-Current Qubits," Quantum Information Processing, vol. 4, No. 4, Oct. 2005, pp. 265-282.

Boghosian, et al., "Quantum lattice-gas model for the many-particle Schrödinger equation in $d$ dimensions," Physical Review E 57, Jan. 1998, pp. 54-66.

Catté, et al.,"Image Selective Smoothing and Edge Detection by Nonlinear Diffusion," SIAM Journal on Numerical Analysis, vol. 29, No. 1, Feb. 1992, pp. 182-193.

Chen, et al., "Simulation of the Burgers equation by NMR quantum-information processing," Physical Review A 74, 2006, pp. 042321-1-042321-7.

Coffey, M. W., "Properties and possibilities of quantum shapelets," Journal of Physics A: Mathematical and General 39, 2006, pp. 877-887.

Coffey, et al., "Multidimensional linear diffusion for image enhancement on a type II quantum computer," Proceedings of the Royal Society A, doi:10.1098/rspa.2007.1878, pp. 1-16.

Cottet, et al., "Image Processing through Reaction Combined with Nonlinear Diffusion," Mathematics of Computation, vol. 61, No. 204, Oct. 1993, pp. 659-673.

El-Fallah, et al., "Nonlinear adaptive image filtering based on inhomogeneous diffusion and differential geometry," SPIE vol. 2182 Image and Video Processing II, 1994, pp. 49-63.

Gradshteyn, et al., Table of Integrals, Series, and Products, Academic Press, New York , 1980, pp. xi-xxii.

Harting, et al., "Large-scale lattice Boltzmann simulations of complex fluids: advances through the advent of computational Grids," Phil. Trans. R. Soc. A 363, 2005, pp. 1895-1915.

Keysers, et al., "Color image dequantization by Constrained Diffusion," Proc. SPIE Electronic Imaging 2006, 11 pages.

Koenderink, J. J., "The Structure of Images," Biological Cybernetics 50, 1984, pp. 363-370.

Lee, et al., "Optimal regularized image restoration algorithm based on backward diffusion equation," Optical Engineering, vol. 43, No. 1, Jan. 2004, pp. 51-62.

Love, et al., "Type II quantum algorithms," Physica A 362 (2006) pp. 210-214.

Nagasawa, M., "Schrödinger Equations and Diffusion Theory," Birkhuser, Basel, Switzerland 1993, 7 pages.

Nielsen, et al., "Quantum Computation and Quantum Information," Cambridge University Press (2000), 9 pages.

Osher, et al., "Feature-Oriented Image Enhancement Using Shock Filters," SIAM Journal on Numerical Analysis, vol. 27, No. 4, Aug. 1990, pp. 919-940.

Perona, et al., "Scale-Space and Edge Detection Using Anisotropic Diffusion," IEEE Transactions on Pattern Analysis and Machine Intelligence, vol. 12, No. 7, Jul. 1990, pp. 629-639.

Pravia, et al., "Towards a NMR implementation of a quantum lattice gas algorithm," Computer Physics Communications 146, 2002, pp. 339-344.

Sakai, et al., "Two-Dimensional Simulation of Tunneling Using Quantum Lattice-Gas Automata," Proc. Nanotech., 2005, 4 pages.

Shor, P. W., "Rapid Communications: Scheme for reducing decoherence in quantum computer memory," Physical Review A, Third Series, vol. 52, No. 4, 1995, pp. R2493-R2496.

Steane, A. M., "Error Correcting Codes in Quantum Theory," Physical Review Letters, vol. 77, No. 5, Jul. 29, 1996, pp. 793-707.

Vahala, et al., "Lattice Boltzmann and quantum lattice gas representations of one-dimensional magnetohydrodynamic turbulence," Physics Letters A 306, 2003, pp. 227-234.

Whitaker, et al., "A Multi-scale Approach to Nonuniform Diffusion," CVGIP: Image Understanding, vol. 57, No. 1, Jan. 1993, pp. 99-110.

Whitaker, R. T., "Geometry-Limited Diffusion in the Characterization of Geometric Patches in Images," CVGIP: Image Understanding, vol. 57, No. 1, Jan. 1993, pp. 111-120.

Yepez, J., "Lattice-Gas Quantum Computation," International Journal of Modern Physics C, vol. 9, No. 8, 1998, pp. 1587-1596.

Yepez, J., "Quantum Lattice-Gas Model for the Diffusion Equation," International Journal of Modern Physics C, vol. 12, No. 9, 2001, pp. 1285-1303.

Yepez, J., "Quantum lattice-gas model for computational fluid dynamics," Physical Review E, vol. 63, 2001, pp. 046702-1-046702-18.

Yepez, et al., "An efficient and accurate quantum lattice-gas model for the many-body Schrödinger wave equation," Computer Physics Communications 146, 2002, pp. 280-294.

Yepez, J., "Quantum Lattice-Gas Model for the Burgers Equation," Journal of Statistical Physics, vol. 107, No. 112, Apr. 2002, pp. 203-224.

Yepez, et al., "Lattice Quantum Algorithm for the Schrödinger Wave Equation in 2+1 Dimensions with a Demonstration by Modeling Soliton Instabilities," Quantum Information Processing 4, 457, 2006, 13 pages.

* cited by examiner

1D Bravais Lattice

METHOD FOR SIGNAL AND IMAGE PROCESSING WITH LATTICE GAS PROCESSES

CROSS-REFERENCE TO RELATED APPLICATIONS

This application claims the benefit of U.S. Provisional Application No. 60/807,410, filed Jul. 14, 2006, which is hereby incorporated by reference herein.

STATEMENT REGARDING FEDERALLY SPONSORED RESEARCH

This invention was made with Government support under Grant FA8750-04-1-0298 awarded by the Air Force. The Government has certain rights in this invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Aspects of the present invention relate to signal and image processing, including signal and image enhancement, signal and image sharpening, and signal and image restoration. One particular aspect of the present invention involves signal and image processing based upon simulation of partial differential equations using classical or quantum lattice gas methods.

BACKGROUND

Digital signal and image processing is generally computationally intensive. Quantum computing techniques offer the potential of exponential speedup of signal and image processing. While quantum Fourier and some quantum wavelet transforms are known, their direct application to signal and image processing is unclear. Classical solutions to signal and image processing generally cannot be directly simulated in a quantum environment. Rather, signal and image processing problems generally have to be reformulated in the quantum context, to take advantage of quantum computing techniques.

While image processing based upon solving partial differential equations (PDEs) is known, image enhancement is generally done using nonlinear PDEs. The computational cost to solve the nonlinear PDEs generally make such signal and image processing prohibitive. What is needed is a method for performing signal and image processing that exploits both classical and quantum parallelism. What is further needed is a method that provides useful signal and image processing without the heavy overall set of requirements for a full phase-coherent quantum computer.

SUMMARY

One aspect of the present invention involves a method for simulating a partial differential equation on a hybrid classical-quantum computer to perform image and signal processing. The method involves mapping a first plurality of discrete data values onto a regularly repeating structure that has a second plurality of nodes. Each node has at least one qubit. The method further involves initializing each node to generate an initial probability distribution for the partial differential equation being solved and performing a unitary entangling operation in parallel across the nodes. Finally the method involves measuring the entangled node states and streaming the node states to neighboring nodes.

Another aspect of the present invention involves a method for simulating a partial differential equation on a type I quantum computer to perform image and signal processing. The method involves mapping a first plurality of discrete data values onto a regularly repeating structure that has a second plurality of nodes. The method further involves initializing each node to generate an initial probability distribution for the partial differential equation being solved, performing a unitary entangling operation in parallel across the nodes and streaming the node states to neighboring nodes. Finally, the method involves measuring the entangled node states.

Yet another aspect of the present invention involves a method for simulating a partial differential equation on a classical computer to perform image and signal processing. The method involves mapping a first plurality of discrete data values onto a regularly repeating structure that has a second plurality of nodes. Each node has a plurality of discrete states. The method further involves initializing each node to generate an initial probability distribution for the partial differential equation being solved, performing a matrix-vector multiplication across the nodes, measuring the node states and shifting the node states to neighboring nodes.

Finally, another aspect of the present invention involves a system for simulating and solving a partial differential equation to perform image and signal processing. The system includes a first quantum computer and a classical processor. The quantum computer includes an input interface for mapping a first plurality of discrete data values onto a regularly repeating structure having a second plurality of nodes, an initializer to initialize each node to the initial probability distribution for the partial differential equation being solved, an operator for performing a unitary entangling operation in parallel across all the nodes and a reader for measuring the states of the nodes subject to entangling. The classical processor receives values from the reader and performs at least one classical operation on the received values.

DETAILED DESCRIPTION OF EMBODIMENTS OF THE INVENTION

I. Introduction

Figure 1:
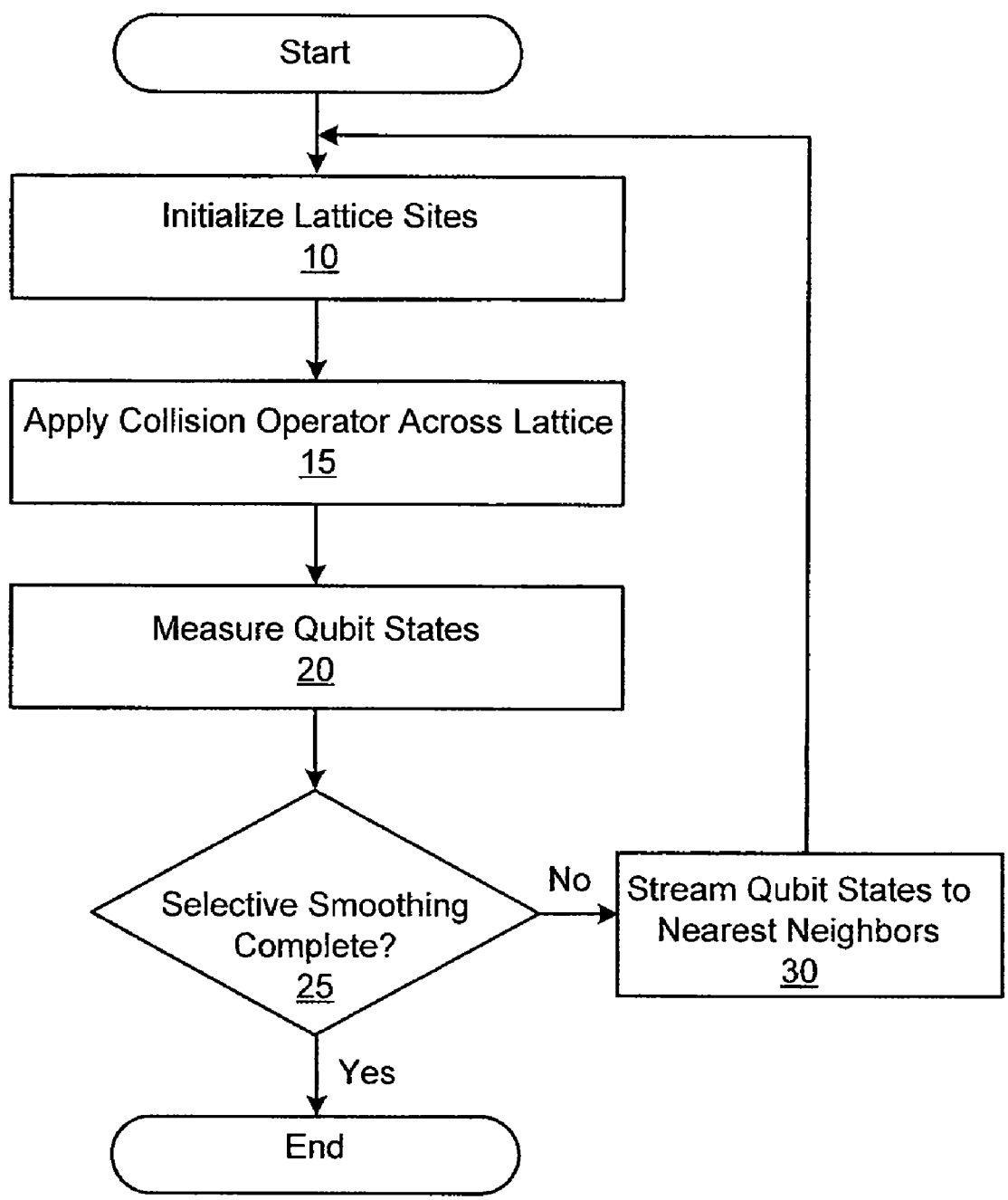
FIG. 1 depicts the processing flow on a type II quantum computer for an embodiment of the present invention.

Aspects of the present invention relate to classical and quantum lattice gas processes to simulate a wide range of both linear and nonlinear partial differential equations (PDEs). These processes may be run on a type I quantum computer, type II quantum computer or a classical computer to perform signal and image processing.

Digital image processing has many applications in the commercial world including multispectral image analysis, optical character recognition, automated and assisted medical diagnosis, inspection and quality control, robotic vision, security and intruder identification, and interactive and automated target recognition. In many of these applications, it may be useful to perform image enhancement prior to additional image processing such as image segmentation or other downstream processing. Image enhancement may be used to improve visual quality, by among other things, reducing the influence of the noise components. Image segmentation generally refers to the process of separating regions of an image or separating objects within an image from the background. In turn, image segmentation can be a building block for further processing such as feature extraction, shape analysis, and object recognition.

In recent years, image processing has been performed by solving partial differential equations (PDEs). These techniques include digital image enhancement and multiscale image representation by way of nonlinear PDEs. Although the quality of the results is generally very high using nonlinear PDEs, the computational cost may make such processing infeasible. One embodiment of the present invention employs a combination of classical and quantum computing resources to exploit both classical and quantum parallelism to provide a less computationally intensive approach for signal and image enhancement. Other embodiments may effectively perform nonlinear filtering of a signal or image using constrained linear diffusion. Constrained linear diffusion may be employed to provide selective intraregion smoothing within an image without the additional computation burden of solving a complex nonlinear PDE. Similarly, constrained linear diffusion may be applied to digital signals, in which case one has numerical values at discrete points in time. The constrained linear diffusion processing on signal values smoothes the effect of noise while preserving signal features. For example, for a pulse train in the presence of noise, the intrapulse values may be smoothed, while retaining leading and trailing edge information.

Hybrid (combined quantum-classical) computing offers possibilities for useful computation to do signal and image processing without the heavy overall set of requirements for a full phase-coherent quantum computer (type I quantum computer). In a type I quantum computer, the qubits generally have to maintain coherence both spatially across all the qubits and temporally for a sufficient length of time to obtain a solution to the problem being simulated. An exponential speedup of the simulation may be possible on a type I quantum computer. Alternatively, a hybrid processor may be used at the expense of reduced speedup of the simulation. A type II quantum computer only needs local phase coherent nodes that can maintain coherence for a short period of time by making intermediate measurements. The relaxation of constraints on the quantum hardware generally comes at the expense of reduced speedup of the simulation. Efficient processes for hybrid processors may be provided by quantum lattice gas processes.

A quantum lattice gas process is a quantum version of a classical lattice gas process, which in turn is an extension of classical cellular automata. When a classical lattice gas process is used, each qubit in the lattice structure can take on a value of zero or one (i.e., the lattice variables have binary values). As such there is no mixing of quantum states when a classical lattice gas process is used to simulate a diffusion process. In a quantum lattice gas process, the qubits of the lattice are generally described by a local Hilbert space. For example, a lattice with two qubits per node can be described using a $2^2$ or four dimensional Hilbert space. A lattice with 3 qubits per node can be described using a $2^3$ or eight dimensional Hilbert space and a lattice with n qubits per node can be described using a $2^n$ dimensional Hilbert space.

In a classical lattice gas process, in order to recover the proper macroscopic dynamics (and thermodynamics), it is important to ensure that the microscopic dynamics preserves conservation laws. That is, mass and momentum are generally conserved. Similarly, in a quantum lattice gas process, the number densities of the qubits generally are preserved (i.e., the system does not create or lose qubits). Imposing this condition on the quantum system means that the interaction operator, called the collision operator, is unitary.

A quantum computer may be any device for computation that makes direct use of distinctively quantum mechanical phenomena, such as superposition and entanglement, to perform operations on data. In a classical (or conventional) computer, the amount of data is measured by bits. At any given time, a given bit is in a definite state, either a zero or a one. The classical computer can perform operations on a register. At any given time, the bits in the register are in a definite state. For example a three bit register may be in the 101 state.

In a quantum computer, data is measured by quantum bits (qubits). Like a bit, a qubit generally can have only two possible values, typically a zero or a one. While a bit must be either zero or one, a qubit can be zero, one, or a superposition of both. The states a qubit may be measured in are known as basis states (or vectors) conventionally expressed as |0> and |1>. Generally, a qubit state is a linear superposition of these two states such that the state of the qubit may be represented by a wave function |ψ> generally expressed as a linear combination of |0> and |1>:

$$|\psi\rangle = \alpha|0\rangle + \beta|1\rangle.$$

That is, a qubit has an amplitude of a of being in the zero state, |0>, and another amplitude β of being in the one state, |1>. The probability amplitudes α and β in general are complex numbers constrained by the following equation:

$$|\alpha|^2 + |\beta|^2 = 1$$

so that the probability of a given qubit being in the zero state plus the probability of that qubit being in the one state is unity.

In a quantum computer, because the qubits can be in a superposition of all the classically allowed states, a three bit register may be described by a wavefunction |ψ>:

$$|\psi\rangle = a|000\rangle + b|011\rangle + c|010\rangle + d|011\rangle + e|100\rangle + f|101\rangle + g|110\rangle + h|111\rangle$$

where the coefficients a, b, c, d, e, f, g and h are in general complex numbers whose amplitude squared represent probabilities of measuring the qubits in each state, e.g., $|c|^2$ is the probability of measuring the register in the state 010. It should be noted that there is a normalization condition on the coefficients such that:

$$|a|^2+|b|^2+|c|^2+|d|^2+|e|^2+|f|^2+|g|^2+|h|^2=1.$$

The coefficients are generally complex due to the fact that the phases of the coefficients can constructively and destructively interfere with one another. Thus, recording the state of a n bit register requires $2^n$ complex coefficients.

Multiple qubits generally exhibit quantum entanglement, a nonlocal property that allows a set of qubits to express higher correlation than is possible in a classical computer. Quantum entanglement also allows multiple states to be acted on simultaneously. That is, because the state of the computer can be in a quantum superposition of many different computational paths, these paths can proceed concurrently (quantum parallelism). Superposition and entanglement allow a type I quantum computer to exponentially speedup a simulation.

One embodiment of the present invention may utilize a classical lattice gas process to simulate a PDE. During the simulation, virtual particles move between imaginary lattice nodes. Collision rules are constructed so that the number of particles, the particle mass, and particle momenta are conserved. A binary number variable may be used to indicate the presence or absence of a particle at a given lattice site. The combination of collision rules and streaming of number variables gives a microdynamical evolution equation. In the continuum limit this evolution equation may be used to calculate macroscopic quantities of interest. Other embodiments of the present invention may employ a lattice having nodes that may have an arbitrary number of discrete values.

A quantum lattice gas process (QLGP) may be executed on a hybrid (or Type II) quantum processor to simulate a PDE by an exemplary embodiment of the present invention. In this particular embodiment, nodes of phase-coherent, entangled qubits are linked by classical communication channels to nearest neighbors in a discrete lattice. That is, a finite set of discrete spatial points contained in a regular lattice structure are generally used to simulate a PDE. The number of lattice points and the number of qubits per node generally may be varied to change the resolution and accuracy of the simulation.

In this embodiment probabilities move between imaginary lattice nodes. The probability amplitudes interact at lattice nodes via a unitary collision operator. When a unitary collision operator is employed, the QLGP is unconditionally stable. That is, even for long time steps the method does not suffer from instability problems as may be common with many classical methods. After measurement, the occupancy probabilities are shifted to neighboring nodes via classical communication channels. When a QLGP is used, particle probabilities are generally conserved, as well as the number of qubits in the system.

In one particular embodiment of the present invention, a QLGP may be implemented through the sequential repetition of four operations on a type II quantum computer. First, a lattice structure is initialized to the quantum-mechanical initial state by mapping the input data to the nodal states of the lattice (i.e., the nodal states are set to the initial probability distribution of a PDE to be solved). In this operation, each qubit is assigned an initial probability amplitude. Second, a unitary transformation is applied in parallel to all the local Hilbert spaces in the lattice. During this operation, the qubits are allowed to collide at the lattice sites. Third, the quantum states of all the nodes are read out (measured). After application of the unitary operator, the states of the qubits at each lattice site are generally entangled. During the measurement operation, the state of each qubit is measured. Upon completion of the measurement operation, the post-collision outgoing occupancy probabilities have been determined. That is, the qubits have interacted and are ready to move to neighboring lattice sites. Finally, these results are shifted or "streamed" to neighboring lattice sites. This operation reinitializes the lattice nodes to the state corresponding to the updated probability distribution. That is, the occupancy probabilities are streamed to their new lattice sites. In one embodiment of the present invention, this may be performed in a classical computer by storing the measured occupancy probabilities at each lattice site that are coming from adjacent lattice sites due to collisions. Periodic boundary conditions may be imposed when streaming at the edges of the lattice.

The number of iterations performed to obtain a solution generally depends on the number of nodes, the number of qubits per node, and the amount of interaction between nodes. For image and signal processing purposes, entropy and other statistical measures may be used to quantify the results. The entropy may be calculated from binning pixel intensities within an image, effectively giving an image histogram. Probabilities may be formed by normalizing such a histogram to provide a basis for calculating various types of entropy including Shannon entropy. Additionally, intraregion smoothing within a signal or image may be monitored by the use of various statistical measures. One instance for the determination of smoothing may be done by using a cutoff value on the standard deviation of pixel values. Other methods of quantifying the smoothing effect of diffusion or other PDE processing of images may be done by monitoring the decrease in Shannon entropy or by counting the number of image "impulses." For 2D images, the impulses may be defined as pixel values differing from the four nearest neighbor pixel values by some fixed threshold. During iteration of PDE processing, the number of impulses and the Shannon entropy tend to decrease and the number of iterations performed may be limited based on this behavior. Generally, 10-100 iterations of the QLGP is sufficient to obtain useful results.

It should be noted that there are many forms of entropy and its generalization, including Renyi entropy and Tsallis entropy, that generally decrease during diffusive processes. As such, such forms of entropy may be used to limit the number of iterations performed by other embodiments of the present invention.

FIG. 1 depicts a flow chart for diffusion processing to enhance image or signal data on either a classical or type II quantum computer. Initially, operation 10 is performed. Operation 10 initializes the lattice nodes to the initial probability distribution for a diffusion process. Then, operation 15 is performed. Operation 15 applies a collision operator in parallel across all lattice nodes. Then, operation 20 is performed. Operation 20 reads out (measures) the quantum state of each qubit. Then operation 25 is performed. Operation 25 checks to see if further processing should be done. If operation 25 determines that additional processing should be done, then operation 30 is performed. Operation 30 streams the qubit states to the nearest neighbors. Then, operation 10 is performed. If operation 25 determines that no further processing is necessary, then processing ends. For example, the iterations may be terminated in one embodiment when the entropy has decreased by 10% from its value in the input image.

It should be noted that the collision operator (applied in operation 15) may be done quantum mechanically when quantum hardware is available. For example, the collision operator could be carried out with trapped ions and laser pulses of specific frequencies interacting with the trapped ions, in effect carrying out an entangling logic gate. Further details on how to implement the collision operator quantum mechanically may be found in the paper "Simulation of the Burgers equation by NMR quantum-information processing," Z. Chen, J. Yepez and D. G. Cory, *Phys. Rev. A* 74, 042321, 2006 and the paper "Towards a NMR implementation of a quantum lattice gas algorithm," M. A. Pravia, J. Yepez and D. G. Cory, *Comp. Phys. Commun.* 146, pp. 339-344, 2002, which are incorporated herein by reference. For certain QLGPs, the collision operator may also be classically simulated via matrix-vector multiplication. That is, matrix-vector multiplication has the effect of taking the tensor product qubit basis states of the lattice nodes to other qubit quantum states, now generally entangled.

Figure 2:
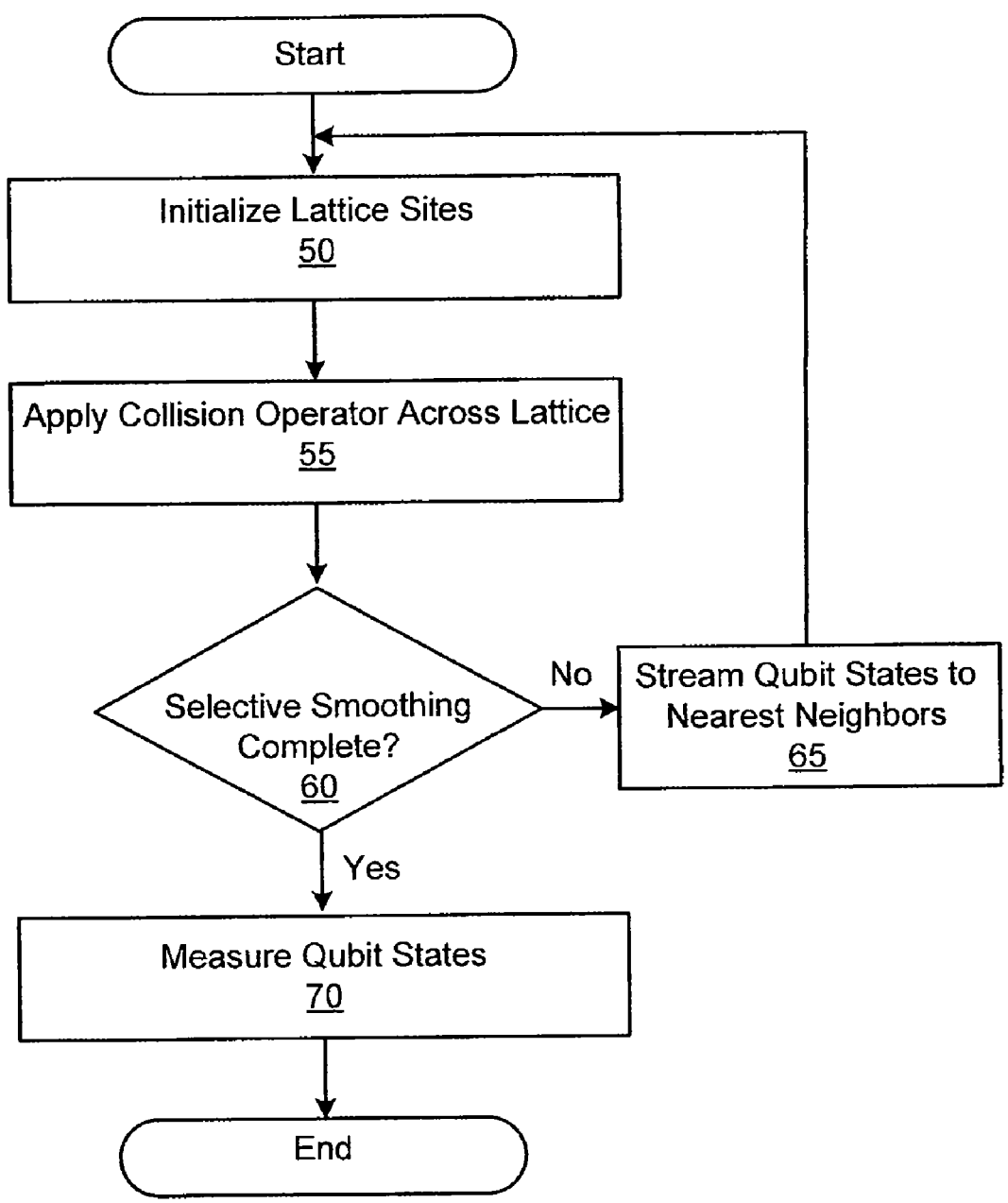
FIG. 2 depicts the processing flow on a type I quantum computer for an embodiment of the present invention.

FIG. 2 depicts a flow chart of the operation of another embodiment of the present invention that omits the measurement step and streams the generally entangled states. This provides an exponential speedup over classical simulation but requires the qubits to maintain coherence for a longer period of time. That is, this embodiment generally would utilize a type I quantum computer. Initially, operation 50 is performed. Operation 50 initializes the lattice nodes to the initial probability distribution of a PDE to be solved. Then, operation 55 is performed. Operation 55 applies a collision operator in parallel across all lattice nodes. For a type I quantum computer, the collision operation would be performed in the quantum mechanical hardware. Then, operation 60 is performed. Operation 60 checks to determine if further processing should be performed. If operation 60 determines that additional processing should be done, then operation 65 is performed. Operation 65 streams the qubit states to nearest neighbors. If operation 60 determines that no further processing should be done, then operation 70 is performed. Operation 70 reads out (measures) the qubit states to obtain the final result.

Alternatively, another embodiment may extend the calculation within the quantum domain before making a measurement, with reduced speedup but with relaxed phase coherence requirements on the quantum hardware.

It should be noted that there is a close connection of linear diffusion with the concept of scale space. A scale-space representation of an image is a special type of multiscale representation that comprises a continuous scale parameter and preserves the same spatial sampling at all scales. In scale-space theory an image may be embedded into a continuous family of gradually smoother versions of the image. A parameter t (time) generally is used to represent the continuous family of images, with the original image corresponding to t=0. Increasing the scale generally simplifies the image without introducing spurious structure. For instance, when viewing a facial image at coarser scales, it is generally undesirable to introduce artificial facial features. A scale-space introduces a hierarchy of image features and may provide a framework for going from a pixel-level description to a semantical image description.

PDEs may provide a suitable framework for scale-space, particularly for a linear diffusion process. For example, the solution of the linear diffusion equation may be given as the convolution of the initial image data with a Gaussian function having a standard deviation proportional to the square root of time, yielding a linear scale space. Such a linear scale space may be implemented in either a hybrid or a type I quantum environment.

II. Examples

Two Dimensions

Figure 3:
FIG. 3 depicts a one-dimensional Bravais lattice structure.
Figure 4A:
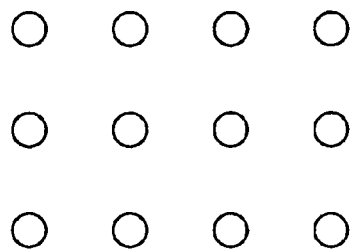
FIG. 4A depicts a square two-dimensional Bravais lattice structure.
Figure 4B:
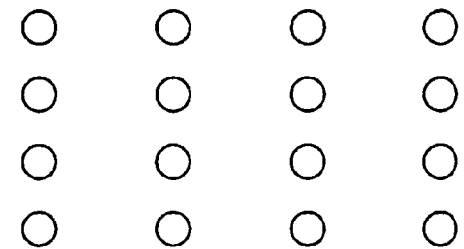
FIG. 4B depicts a rectangular two-dimensional Bravais lattice structure.
Figure 4C:
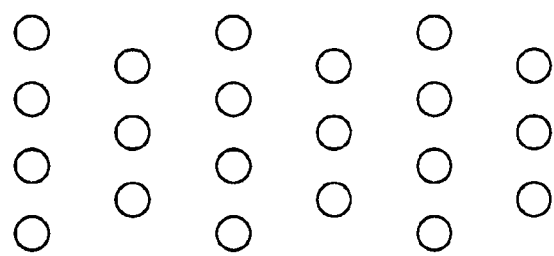
FIG. 4C depicts a centered rectangular two-dimensional Bravais lattice structure.
Figure 4D:
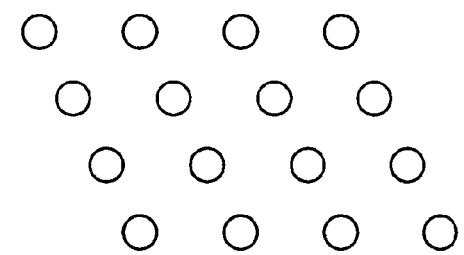
FIG. 4D depicts an oblique two-dimensional Bravais lattice structure.
Figure 4E:
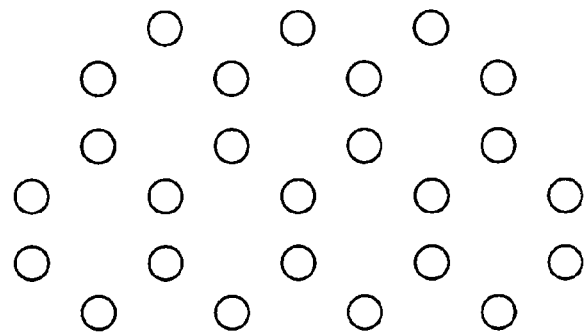
FIG. 4E depicts a hexagonal two-dimensional Bravais lattice structure.

An exemplary embodiment may implement the QLGP on a general Bravais lattice. A Bravais lattice is a point lattice that is classified topologically according to the symmetry properties under rotation and reflection, without regard to the absolute length of the unit vectors. That is, at every point in a Bravais lattice the "world" looks the same. In one-dimensional space, there is only one Bravais lattice as depicted in FIG. 3. FIGS. 4A-E depict the two-dimensional Bravais lattices (square, rectangular, centered rectangular, oblique and hexagonal). In three-dimensional space, there are fourteen Bravais lattices. These lattices can be generated by combining one of seven axial systems with one of four lattice centerings. The axial systems are triclinic, monoclinic, orthorhombic, tetragonal, rhombohedra, hexagonal and cubic. The lattice centerings are primitive centering (lattice points on the cell corners only, body centered (one additional lattice point at the center of the cell), face centered (one additional lattice point at the center of each of the faces of the cell, and centered on a single face (one additional lattice point at the center of one of the cell faces). Bravais lattices for higher dimensions may also be utilized depending on the nature of the simulation.

While any regular lattice structure may be used, the symmetry of a Bravais lattice structure generally results in simpler boundary conditions at the edges of the discrete lattice structure and simpler calculations. However, the present invention may be implemented on any lattice structure by developing an appropriate collision operator and by using ancillary qubits to account for boundary conditions. That is, ancillary (or work) qubits may be associated with the boundary of the lattice and may be used for nonperiodic boundary conditions. The states of these ancillary qubits may be used for the accounting of probability amplitudes for qubits along the boundary. The states of the ancillary qubits generally do not enter the effective finite difference approximation for the PDE satisfied by the evolving density.

While the present invention may implement a QLGP on a lattice structure of any number of dimensions and employ a varying number of qubits per lattice node, the general concepts will be explained for a type II quantum computer employing a two dimensional (2D) rectangular lattice structure having two qubits per lattice node. This is done by way of illustration only and not by way of limitation.

One exemplary embodiment of the present invention may employ a type II quantum computer to simulate a 2D diffusion equation on a rectangular lattice of L×M nodes, with two qubits per node. The state of a qubit can be expressed as:

$$|q_a(x,y,t)\rangle = \sqrt{f_a(x,y,t)}|1\rangle + \sqrt{1-f_a(x,y,t)}|0\rangle, a=1,2$$

where the occupancy probability $f_a$ is defined below. The local wavefunction at each lattice node may be expressed as a tensor product:

$$|\psi(x,y,t)\rangle = |q_1(x,y,t)\rangle \otimes |q_2(x,y,t)\rangle.$$

Figure 5:
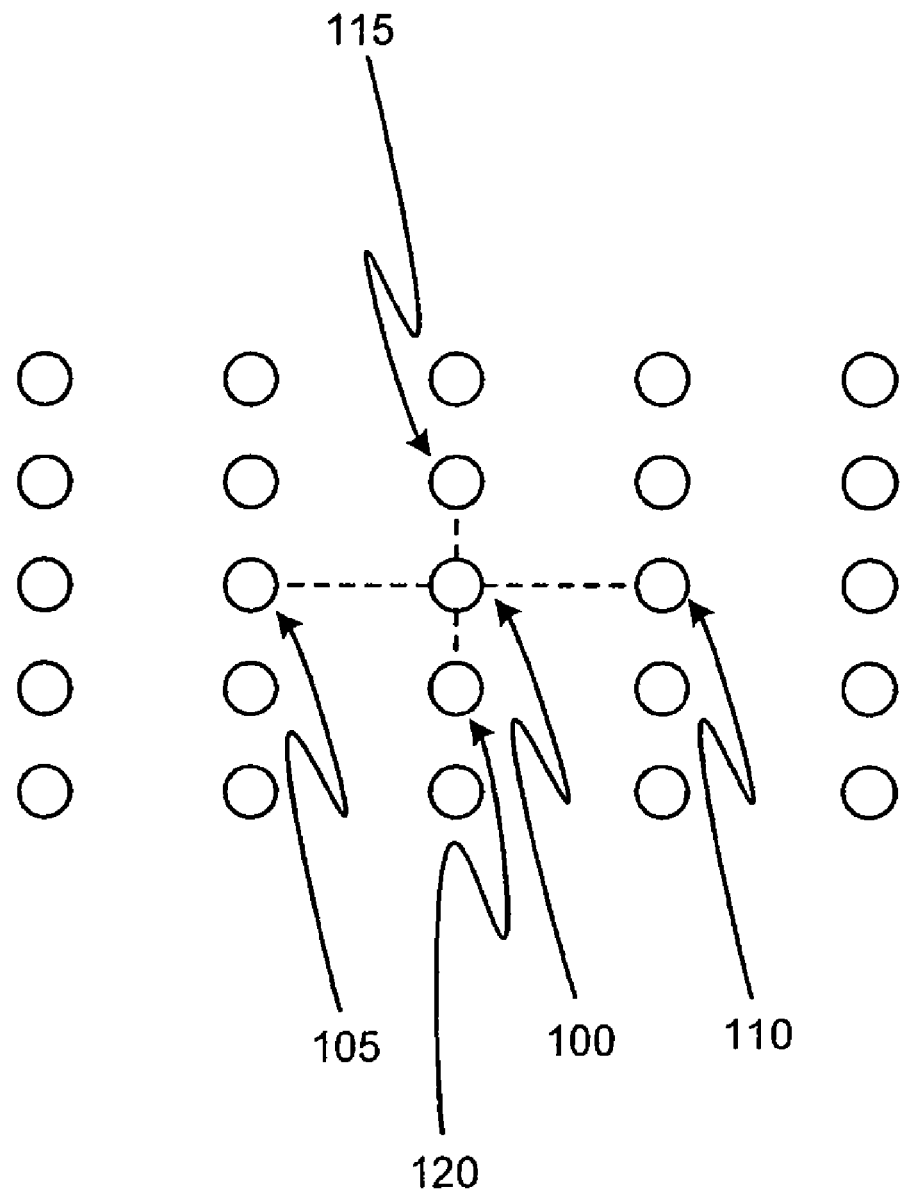
FIG. 5 depicts the nearest neighbor lattice sites for a two-dimensional rectangular lattice structure.

A lattice node 100 at location (x,y) may be connected by classical communication channels, depicted by dashed lines, to each of its four nearest neighbors 105 (at location (x−Δx, y)), 110 (at location (x+Δx,y)), 115 (at location (x,y+Δy)), 120 (at location (x,y−Δy)), as depicted in FIG. 5. Thus, the Hilbert space for a lattice node has four basis states:

$$|00\rangle = |0\rangle = (0,0,0,1)^T,$$

$$|01\rangle = |1\rangle = (0,0,1,0)^T,$$

$|10\rangle = |2\rangle = (0,1,0,0)^T$, and $|11\rangle = |3\rangle = (1,0,0,0)^T$.

The number operators $n_1$ and $n_2$ for the two qubits, $|q_1\rangle$ and $|q_2\rangle$, at each lattice node can be expressed as:

$$n_1 = diag(1, 1, 0, 0) = \begin{bmatrix} 1 & 0 & 0 & 0 \\ 0 & 1 & 0 & 0 \\ 0 & 0 & 0 & 0 \\ 0 & 0 & 0 & 0 \end{bmatrix}$$

$$n_2 = diag(1, 0, 1, 0) = \begin{bmatrix} 1 & 0 & 0 & 0 \\ 0 & 0 & 0 & 0 \\ 0 & 0 & 1 & 0 \\ 0 & 0 & 0 & 0 \end{bmatrix}$$

where $n_1$ indicates when $|q_1\rangle$ is in the 1 state and $n_2$ indicates when $|q_2\rangle$ is in the 1 state.

The occupancy probability, $f_j$, of the jth qubit at lattice site (x,y) at time t is given by $$f_j(x,y,t) = \langle \psi(x,y,t) | n_j | \psi(x,y,t) \rangle,$$

where j=1, 2. A density, $\rho$, at the node at (x,y,t) is given by the sum of the occupancy probabilities $f_1$ and $f_2$:

$$\rho(x,y,t) = f_1(x,y,t) + f_2(x,y,t).$$

The embodiment then applies an appropriate sequence of quantum gate and classical shift operations (that is, a combination of collision, measurement and streaming operations as further discussed below) across the lattice so that the density function $\rho$ evolves in time as a solution of the linear diffusion equation:

$$\frac{\partial u}{\partial t} = \frac{1}{4\tau}\left(\Delta x^2 \frac{\partial^2 u}{\partial x^2} + \Delta y^2 \frac{\partial^2 u}{\partial y^2}\right).$$

Although the diffusion is linear, it can be made anisotropic by choosing the lattice spacings $\Delta x$ and $\Delta y$ in the x and y directions, respectively, to be unequal.

As previously discussed, a QLGP may be implemented by iterating four operations (initialization, collision, measurement, and streaming) over time. Generally, each iteration of the QLGP occurs at a time step $\tau$. This time may be divided into substeps based upon the number of qubits and nodes allowed to interact. While a qubit may interact with neighboring lattice nodes in many different ways, for a 2D lattice, simple interaction of qubits limited to nearest neighbors is generally sufficient to obtain usable results. Further, the streaming operation may be limited to one qubit per node with the other qubit being treated as a stationary (at rest) qubit.

For a 2D lattice with communication between nearest neighbors wherein only one of the two qubits at each node is streamed (i.e., one qubit is allowed to move between nearest neighbors while the other qubit is stationary or at rest), the time step $\tau$ may be divided into four substeps of length $\tau/4$. Each substep generally is a combination of a collision, a measurement and a streaming operation. In an exemplary embodiment, the local collision operator U may be based upon the $\sqrt{SWAP}$ gate (also referred to as the SQRT(SWAP) gate), an entangling quantum gate:

$$U_{\sqrt{SWAP}} = \begin{bmatrix} 1 & 0 & 0 & 0 \\ 0 & \frac{1}{2}(1-i) & \frac{1}{2}(1+i) & 0 \\ 0 & \frac{1}{2}(1+i) & \frac{1}{2}(1-i) & 0 \\ 0 & 0 & 0 & 1 \end{bmatrix}.$$

Note that the collision operator has a subblock that entangles states $|01\rangle$ and $|10\rangle$. While more qubit states could be entangled, entanglement of the two middle states is generally sufficient to carry out a diffusion process.

During each iteration of the QLGP, the moving qubit may be streamed to the left, to the right, up and down. The collision operator is homogeneously applied across the lattice, the qubit states are measured, and then the moving qubit is streamed one lattice site to the left. The collision operator is then homogeneously applied across the entire lattice, the qubit states are again measured, and then the moving qubit is streamed one lattice site to the right. The collision operator is then homogeneously applied across the entire lattice, the qubit states measured, and then the moving qubit is streamed one lattice site up. Finally, the collision operator is homogeneously applied across the entire lattice, the qubit states measured and the moving qubit is streamed one lattice site down. The moving qubit generally is streamed to the left, to the right, up and down to keep the macroscopic dynamics unbiased and symmetrical. Thus, every time step may involve four applications of the collision operator and the streaming operator.

It should be noted that the measurement of $f_1$ and $f_2$ at each step may be determined by either repeated measurement of a single realization of the quantum system or by a single measurement over a statistical ensemble of quantum systems. Because a quantum computation is generally probabilistic, the correct value can be determined, to a high probability, by averaging the measurement results.

Assuming that the occupancy probabilities, $f_1$ and $f_2$, do not deviate much from their equilibrium values of $\rho/2$, the evolution of density can be approximated by a finite difference. That is, a finite difference for each of the four substeps described above can be added together to obtain:

$$\rho(x,y,t+\tau) - \rho(x,y,t) = -(1/2)[\rho(x,y,t) + \rho(x,y,t+\tau/4) + \rho(x,y,t+\tau/2) + \rho(x,y,t+3\tau/4)] + (1/2)[\rho(x+\Delta x, y, t+\tau/4) + \rho(x-\Delta x, y, t+\tau/4) + \rho(x, y+\Delta y, t+\tau/2) + \rho(x, y-\Delta y, t+3\tau/4)].$$

This can be simplified by substituting the four substep equations at $x \pm \Delta x$ and $y \pm \Delta y$ to obtain:

$$\rho(x,y,t+\tau) - \rho(x,y,t) = (1/16)[-12\rho(x,y,t) + 2\rho(x,y-\Delta y,t) + 2\rho(x,y+\Delta y,t) + 2\rho(x-\Delta x,y,t) + \rho(x-\Delta x,y-\Delta y,t) + \rho(x-\Delta x,y+\Delta y,t) + \rho(x+\Delta x,y,t) + \rho(x+\Delta x,y-\Delta y,t) + \rho(x+\Delta x,y+\Delta y,t)].$$

The right side of the above equation can be Taylor expanded up to the second order in $\Delta x$ and $\Delta y$ to obtain:

$$\rho(x, y, t+\tau) - \rho(x, y, t) = \frac{1}{4}\left(\frac{\partial^2 \rho}{\partial x^2}\Delta x^2 + \frac{\partial^2 \rho}{\partial y^2}\Delta y^2\right) + O(\Delta x^4) + O(\Delta y^4) + O(\Delta x^2 \Delta y^2)$$

A similar expansion of the left side of this equation to lowest order in $\tau$ results in the linear diffusion equation given above.

In another embodiment, a more symmetric sequence of substeps for each iteration of the QLGP implemented on a 2D rectangular lattice with two qubits per node may be utilized.

Greater symmetry may be obtained through the addition of four more substeps to only shift the state of the first qubit of each lattice node.

While two qubits per lattice node was used for illustration purposes, the present invention is not so limited. In general, each lattice node may have more qubits per node. The additional qubits may be used for error correction, allowing longer measurement intervals. The additional qubits may also be used to obtain higher measurement accuracy by streaming the additional qubits to additional lattice sites such as next nearest neighbors in a 2D rectangular lattice. Streaming to more lattice sites improves simulation accuracy and may allow the number of iterations to be reduced.

The iterative four operation QLGP described above for a 2D square lattice structure with two qubits per lattice node was verified using a Gaussian distribution centered over the square lattice with unit lattice spacing $\Delta x = \Delta y = l = 1$. This 2D bell curve may be expressed by the following equation:

$$g(x, y, t) = \frac{1}{2} + \frac{1}{4} \frac{\sigma_0}{\sigma^2(t)} e^{-\left[\left(x-\frac{L}{2}\right)^2 + \left(y-\frac{L}{2}\right)^2\right]/\sigma^2(t)}$$

where $$\sigma(t) \equiv \sqrt{\sigma_0^2 + 4Dt}.$$

Figure 6:
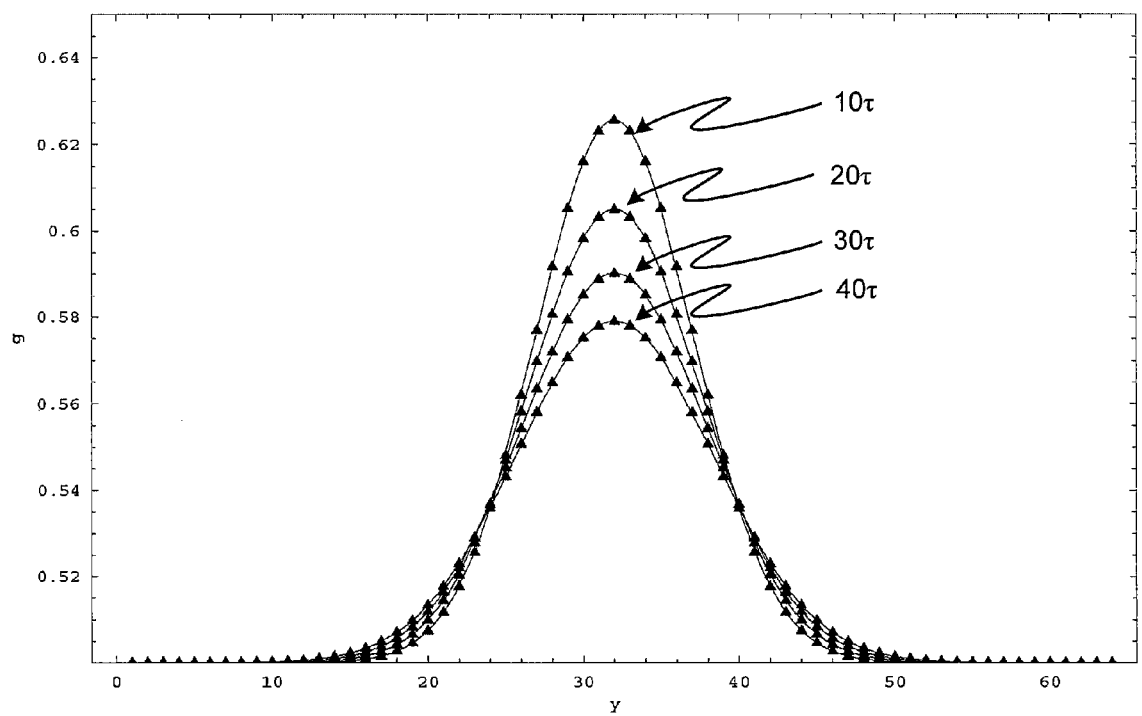
FIG. 6 depicts the exact (solid curve) and numerical solutions (triangles) for a two-dimensional diffusion problem at time steps of $10\tau$, $20\tau$, $30\tau$, and $40\tau$. The exact solution is given by a two-dimensional Gaussian function.

A square lattice of size 64×64, a width parameter $\sigma_0 = 0.1$ L and a diffusion constant $D = l^2/4\tau$ was used. The 2D diffusion algorithm was initialized with the values $g(x,y,0)/2$ for each of the occupancy probabilities $f_1$ and $f_2$. FIG. 6 depicts a sequence of superposed plots at times $10\tau$, $20\tau$, $30\tau$, and $40\tau$ for both the numerical (denoted by triangles) and exact solution (denoted by solid curve) along the midline (L/2,y). As FIG. 6 depicts, the numerical solution tracks the exact solution very well. See Appendix A for the MATHEMATICA program listing used to generate the plots depicted in FIG. 6. Additional validating 2D simulation examples for the 2D square lattice structure with two qubits per lattice node, including a 2D Dirac delta distribution and a sinusoidal function, are described in U.S. Provisional Application No. 60/807,410, filed Jul. 14, 2006, which is hereby incorporated by reference herein. Additional detail and examples can also be found in "Multidimensional Linear Diffusion for Image Enhancement on a Type II Quantum Computer," M. W. Coffey and G. G. Colburn, *Proc. Royal Soc. A*, DOI 10.1098/rspa.2007.1878 (available online), which is incorporated herein by reference.

While a linear diffusion process has been described above, it should be noted that there exists a mapping between pairs of Schrödinger equations (the Schrödinger equation for a wavefunction, and the complex conjugate equation) and pairs of diffusion equations. This mapping is such that the product of the companion solutions are the same, and this is related to the probabilistic interpretation of the complex square of the wavefunction. The mapping is such that the linear diffusion processes correspond to nonlinear Schrödinger equations and vice versa. Further details on the mapping between Schrödinger equations and diffusion processes can be found in "Schrödinger Equations and Diffusion Theory," N. Nagasawa, *Birkhauser, Basel, Switzerland,* 1993, which is incorporated herein by reference.

Some embodiments of the present invention may make use of the above relationship to transform a diffusion processing task (that may be performed on a type II quantum computer) to a Schrödinger equation simulation suitable to be run on a type I quantum computer to obtain a speedup of the simulation approaching exponential gain. Generally, in this particular embodiment of the present invention, the entangled qubits are streamed with no intermediate measurement operations. Thus, only one measurement is generally done at the end of the simulation to obtain the final result.

III. Examples

Greater than Two Dimensions

Other embodiments of the present invention may extend the method described above for 2D linear anisotropic diffusion to any number of Cartesian dimensions using cubic or hypercubic lattices. For each additional dimension two additional operations of collision, measurement, and streaming of the second qubit may be applied while maintaining the state of the first qubit. For example, in three dimensions (3D), an overall time step of $\tau$ is split into six sub operations, with the last two sub operations performing streaming of the second qubit in the $\pm z$ directions. The finite difference approximation for 3D, with leading order terms, may be expressed as:

$$\rho(x, y, z, t+\tau) - \rho(x, y, z, t) = \frac{1}{4}\left(\frac{\partial^2 \rho}{\partial x^2}\Delta x^2 + \frac{\partial^2 \rho}{\partial y^2}\Delta y^2 + \frac{\partial^2 \rho}{\partial z^2}\Delta z^2\right) +$$
$$O(\Delta x^4) + O(\Delta y^4) + O(\Delta z^4) O(\Delta x^2 \Delta y^2) + O(\Delta x^2 \Delta z^2) + O(\Delta y^2 \Delta z^2)$$

In the continuum limit this becomes:

$$\frac{\partial u}{\partial t} = \frac{1}{4\tau}\left(\Delta x^2 \frac{\partial^2 u}{\partial x^2} + \Delta y^2 \frac{\partial^2 u}{\partial y^2} + \Delta z^2 \frac{\partial^2 u}{\partial z^2}\right)$$

the 3D linear anisotropic diffusion equation.

Similarly, extending the method for $R^n$ with streaming of the second qubit only results in the following nD anisotropic linear PDE:

$$\frac{\partial u}{\partial t} = \frac{1}{4\tau}\left(\Delta x_1^2 \frac{\partial^2 u}{\partial x_1^2} + \Delta x_2^2 \frac{\partial^2 u}{\partial x_2^2} + \ldots + \Delta x_n^2 \frac{\partial^2 u}{\partial x_n^2}\right)$$

It should be noted that the collision operator should be generalized for the number of lattice dimensions and for the number of qubits per lattice node. The collision operator may also be modified to account for lattice symmetry.

It should be noted that a time sequence of 2D images can be thought of as an image processing problem in three dimensions. For example, one embodiment of the present invention may process a concatenated time sequence of 2D images by using 3D space-time to perform the image processing. This enables moving objects within the images to be detected by discriminating changing features in such images.

In the field of medicine, magnetic resonance imaging, positron emission tomography, single-photon emission computed tomography and other techniques provide 3D data for use in patient diagnosis and treatment. Observational astronomy and holography also make use of 3D images. An embodiment of the present invention may apply diffusion processing to perform selective 3D image smoothing and feature extraction. A time sequence of 3D images may be thought of as an image processing problem in four dimensions that may be processed using 4D diffusion processing.

Thus, the multidimensional image processing techniques of the present invention may be applied to process image data in several dimensions.

IV. Intermediate Classical Processing

Particular embodiments of the present invention may incorporate intermediate classical processing operations. Such processing operations may be attractive when the computational cost is low. For example, image thresholding may be performed by resetting all pixel values once they have reached a certain range. For example, all pixel values below 5 in a 0-255 pixel range image may be reset to 0 (black). Other classical processing operations may include dilation and masking.

Some embodiments of the present invention may combine a linear diffusion step with a constraint condition step, i.e., an intermediate classical processing operation. Such constrained linear diffusion provides a method for nonuniform image smoothing that effectively performs nonlinear operations on the image without incurring the computational cost of simulating a nonlinear PDE. Since measurement of qubit states is part of a QLGP, the constraint step may be easily incorporated into the overall method as a subpart of the measurement step.

Whereas an image generally consists of pixel values identified with discrete spatial locations, a signal is typically associated with discrete points in time. However, it should be noted that since a signal may be thought of as a one-dimensional image, constrained diffusion may be performed on a signal in a similar fashion. A constraint on signal value differences may be employed such that portions of the signal with relatively small variation are preferentially smoothed while signal transitions are retained.

Figure 7:
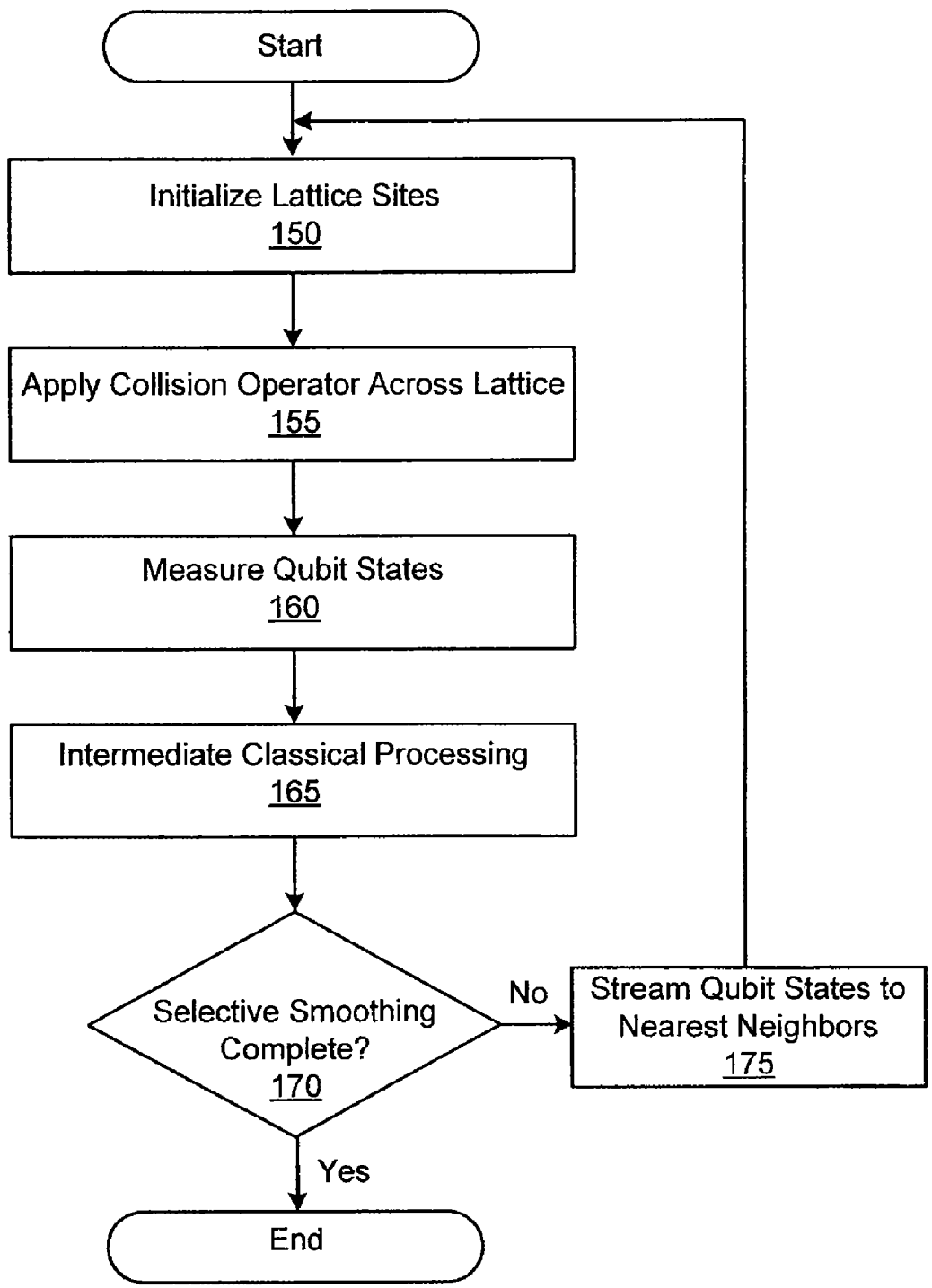
FIG. 7 depicts the processing flow for constrained diffusion processing performed by an embodiment of the present invention.

FIG. 7 depicts a flow chart employed by one embodiment of the present invention for performing constrained linear diffusion. Initially, operation 150 is performed. Operation 150 initializes the lattice nodes to the initial probability distribution for a diffusion process. Then, operation 155 is performed. Operation 155 applies a collision operator in parallel across all lattice nodes. Then, operation 160 is performed. Operation 160 reads out (measures) the quantum state of each qubit. Then, operation 165 is performed. Operation 165 imposes a constraint (or other intermediate classical processing). Then operation 170 is performed. Operation 170 checks to see if further processing should be done. If operation 170 determines that additional processing should be done, then operation 175 is performed. Operation 175 streams the qubit states to the nearest neighbors. Then, operation 150 is performed. If operation 170 determines that no further processing is necessary, then processing ends.

For example, one embodiment of the present invention imposes a constraint step in the above linear diffusion process to process an image in two spatial dimensions. Such processing results in image regions with similar pixel intensities being diffused while regions with large differences such as edges are generally preserved. That is, constrained linear diffusion can be attractive in 2D image processing to preferentially preserve the edge information contained in the image. In the absence of noise, an edge occurs at places of discontinuity in image intensity. Generally, an edge may be taken as a portion of an image where an abrupt change occurs in pixel intensity. Thus, edge information tends to outline objects within an image and carries information about the form, structure, and relationships of the objects.

The original image to be processed may be denoted by $I_0$. At each iteration j, j=1, 2, . . . , the following operations may be performed on image $I_j$: (1) a 2D linear diffusion giving a resulting image $I_j'$; and (2) the pixelwise constraint:

$$I_{j+1}(x,y) = \max[I_0(x,y)-\delta, \min(I_0(x,y)+\delta, I_j'(x,y))]$$

where $\delta$ is a processing parameter. It may be chosen according to the distribution of pixel values or other properties of the image being processed. For instance, $\delta$ may be taken as proportional to the quantization level for pixel intensities. For example, a gray scale image with pixel values in the range 0 to $2^8-1$ might use a $\delta$ approximately equal to $2^{-8}$.

The measurement and constraint step effectively provides a form of nonlinear operation within the processing. This is advantageously employed by some embodiments of the present invention implemented on a type II quantum computer. From 10 to 100 iterations of constrained linear diffusion is generally sufficient to provide useful image enhancement.

When an image is processed, each pixel in an image may be mapped to a lattice node. That is, an image that is 256 pixels by 256 pixels may be mapped onto a 2D lattice of size 256× 256. Should the image contain more pixels than available lattice nodes, the image may be down sampled using well known techniques to reduce the image resolution to a size that can be mapped onto the lattice structure. Alternatively, sub-portions of the image could be subjected to PDE processing.

Figure 8A:
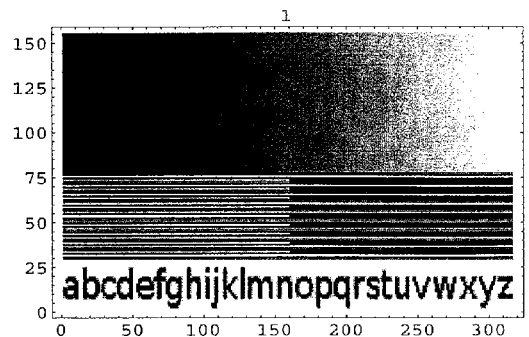
FIGS. 8A-C depict a sequence of images resulting at iterations 1, 25, and 50 from a constrained diffusion process employed by one embodiment of the present invention.
Figure 8D:
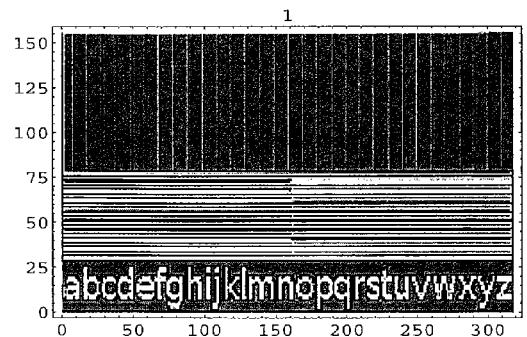
FIGS. 8D-F depict the differences between the original image and processed images 8A-C, respectively.
Figure 8B:
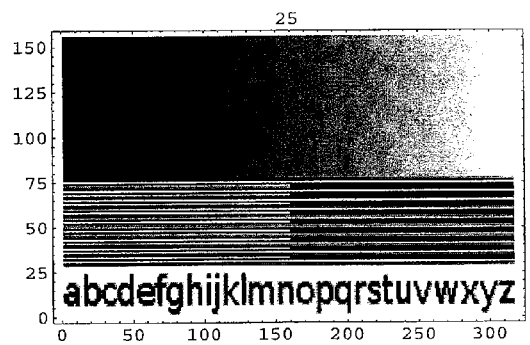
Figure 8E:
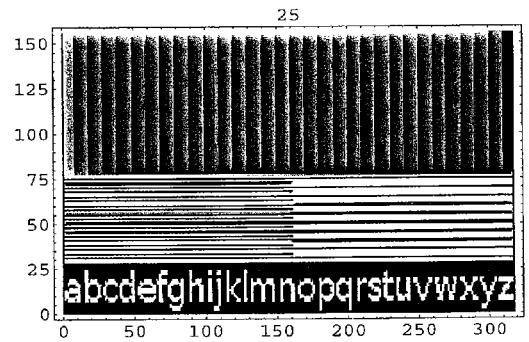
Figure 8C:
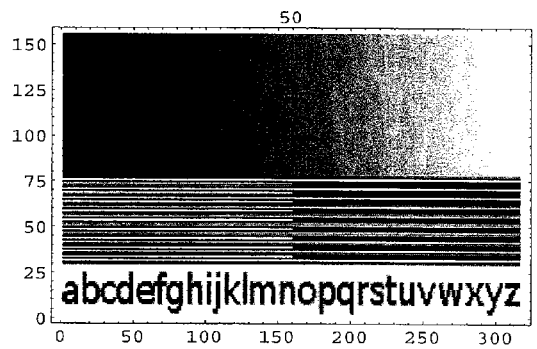
Figure 8F:
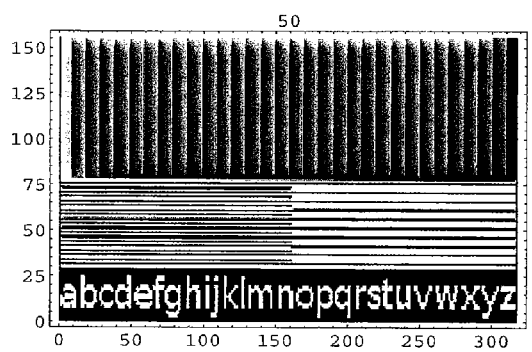

To verify the above constrained linear diffusion process, an image with 8-bit intensity values was non-uniformly smoothed. A 2D rectangular lattice having two qubits per node was used. Each of the occupancy probabilities $f_j(x,y,0)$ for the two-qubit nodes was initialized as one-half of the pixel intensity divided by 255. The input image (after one iteration) is depicted in FIG. 8A. It contains a rectangular region of smooth grayscale variation, rectangular striped regions, and a sample alphabetic text region. Using this input image, the 2D constrained linear diffusion process was run for 50 iterations using a $\delta$ of 0.025. FIG. 8B depicts the image after 25 iterations and FIG. 8C depicts the image after 50 iterations. As can be seen, the features of the input image are preserved over time. In order to better illustrate the pixel changes during the constrained diffusion processing, FIGS. 8D-F depict the difference between the original image the result of the constrained processing at the corresponding iteration. As depicted by the sequence of Images in FIGS. 8A-C, the desirable property of intraregion smoothing has occurred. For instance, in the largest single rectangular region in the top of the image, the original grayscale stepping has been smoothed. This has occurred while the striping and textual information in the rest of the image has been maintained. See Appendix B for the MATHEMATICA program listing used to generate the images depicted in FIGS. 8A-F.

Figure 9A:
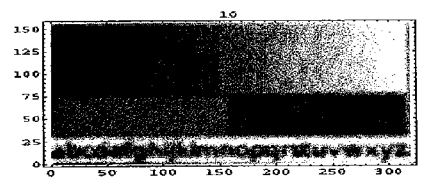
FIGS. 9A-D depict the rapid blurring that occurs when diffusion processing without a constraint condition is used for image processing.
Figure 9C:
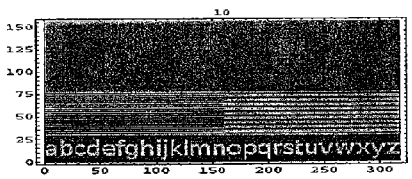
Figure 9B:
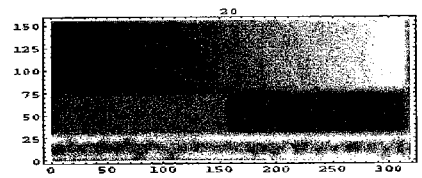
Figure 9D:
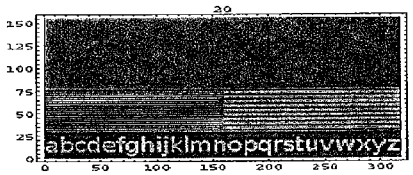

As depicted in FIGS. 9A-D, linear diffusion alone generally results in the image becoming uniformly blurred. The input image (after 10 iterations) is depicted in FIG. 9A. FIG. 9B depicts the image after 20 iterations. FIGS. 9C-D depict the difference between the original image the result of the unconstrained diffusion processing at the corresponding iteration.

Anisotropic diffusion may be used to diffuse image intensities along edges of objects that appear within the image, while not diffusing (or even enhancing the contrast) along directions that are perpendicular to edges.

While the present invention has been described for a linear diffusion process implemented on a 2D rectangular lattice with 2 qubits per lattice node, this was for purposes of illustration only and not by way of limitation. The present invention may also simulate PDEs other than the linear diffusion equation. Instead of the complex-valued collision operator SQRT(SWAP) gate used for linear diffusion, an appropriate collision operator for the PDE being solved is used. For example, the present embodiment may be used to simulate the Burgers' equation:

$$\frac{\partial u}{\partial t} + u\frac{\partial u}{\partial x} = \nu\frac{\partial^2 u}{\partial x^2}$$

where the constant $\nu$ may be thought of as a viscosity coefficient. The Burgers' equation is a simple form of a nonlinear diffusion equation that may be used to model simple fluid turbulence, but may also be used for image processing as discussed below.

In this particular instance, a collision operator may be based on the SQRT(NOT) gate:

$$U = \begin{bmatrix} 1 & 0 & 0 & 0 \\ 0 & 1/\sqrt{2} & 1/\sqrt{2} & 0 \\ 0 & -1/\sqrt{2} & 1/\sqrt{2} & 0 \\ 0 & 0 & 0 & 1 \end{bmatrix},$$

where the central 2×2 sub-block is derived from the NOT gate. This sub-block entangles the |01> and |10> quantum states. This U gate is also unitary and thereby preserves particle number.

Burgers' equation may be considered a simplified nonlinear PDE exhibiting front steepening and shock formation. The steep profiles that form during Burgers' equation evolution may be employed by an embodiment of the present invention to perform image enhancement and image restoration. The front steeping capability of Burgers' equation results from the quadratically nonlinear term.

The present invention may employ lattice structures with any number of dimensions and may have any number of qubits per lattice node. For example, a lattice built from hexagons and with nodes containing two, three or six qubits could be employed. In such a case, the collision operator would be extended in an appropriate manner and need not give a symmetric mixing of occupancy probabilities. While rectangular lattices or their higher dimensional analogs were described, the lattice spacings in each Cartesian direction need not be the same. The invention may also be used to perform multidimensional image processing in several dimensions. For example, the invention may be applied to a concatenated time sequence of images by using 3D space-time to perform image processing. This enables moving objects within the images to be detected by discriminating changing features in such images. The invention may also use 4D diffusion processing to perform image processing on a time sequence of 3D images (4D space-time).

What is claimed is:

1. A method for simulating a partial differential equation (PDE) on a hybrid classical-quantum computer to perform image and signal processing, the method comprising:
    (a) mapping a plurality of discrete data values onto a regularly repeating structure having a plurality of nodes, each node having at least one qubit;
    (b) initializing each node based upon the discrete data values to generate an initial probability distribution for the PDE being solved;
    (c) performing a unitary entangling operation in parallel across the nodes such that each node is entangled;
    (d) measuring states of entangled nodes; and
    (e) streaming states of the nodes to neighboring nodes;
wherein the partial differential equation is a two dimensional nonlinear diffusion equation, the discrete data values represent image pixel intensities, and the two dimensional nonlinear diffusion equation is a Burgers' equation.

2. The method of claim 1 wherein the unitary entangling operation is based upon a SQRT(NOT) gate.

3. A method for simulating a partial differential equation (PDE) on a hybrid classical-quantum computer to perform image and signal processing, the method comprising:
    (a) mapping a plurality of discrete data values onto a regularly repeating structure having a plurality of nodes, each node having at least one qubit;
    (b) initializing each node based upon the discrete data values to generate an initial probability distribution for the PDE being solved;
    (c) performing a unitary entangling operation in parallel across the nodes such that each node is entangled;
    (d) measuring states of entangled nodes;
    (e) streaming states of the nodes to neighboring nodes; and
    (f) repeating the operations (b)-(e) until a statistical measure has been satisfied.

4. The method of claim 3 wherein the statistical measure is an entropy measure.

5. A method for simulating a partial differential equation (PDE) on a hybrid classical-quantum computer to perform image and signal processing, the method comprising:
    (a) mapping a plurality of discrete data values onto a regularly repeating structure having a plurality of nodes, each node having at least one qubit;
    (b) initializing each node based upon the discrete data values to generate an initial probability distribution for the PDE being solved;
    (c) performing a unitary entangling operation in parallel across the nodes such that each node is entangled;
    (d) measuring states of entangled nodes;
    (e) streaming states of the nodes to neighboring nodes; and
    (f) performing a classical processing operation after measuring the entangled node states;
wherein the classical processing operation is the imposition of a constraint condition to preserve image edge information.

6. The method of claim 5 wherein the constraint condition is a pixelwise constraint.

7. A method of simulating a partial differential equation (PDE) on a type I quantum computer to perform image and signal processing, the method comprising:
    (a) mapping a plurality of discrete data values onto a regularly repeating structure having a plurality of nodes, each node having at least one qubit;
    (b) initializing each node based upon the discrete data values to generate an initial probability distribution for the PDE being solved;
    (c) performing a unitary entangling operation in parallel across the nodes such that each node is generally entangled;
    (d) streaming states of the nodes to neighboring nodes;
    (e) measuring states of entangled nodes; and
    (f) repeating the operations (b)-(d) until a statistical measure has been satisfied.

8. The method of claim 7 wherein the statistical measure is an entropy measure.

9. A system for simulating and solving a partial differential equation (PDE) to perform image and signal processing comprising:
  a first quantum computer comprising:
    an input interface for mapping a plurality of discrete data values onto a regularly repeating structure having a plurality of nodes, each node having at least one qubit;
    an initializer for initializing each node based upon the discrete data values to generate an initial probability distribution for the PDE being solved;
    an operator for performing a unitary entangling operation in parallel across all the nodes:
    a reader for measuring states of nodes subject to entangling; and
    a first classical processor for receiving values from the reader and performing at least one classical operation on the received values;
wherein the at least one classical operation is selected from the group consisting of thresholding, dilation and masking operations and combinations thereof.

* * * * *